(12) United States Patent
Harris

(10) Patent No.: US 8,756,155 B2
(45) Date of Patent: Jun. 17, 2014

(54) WEB BASED COMMUNICATION OF INFORMATION WITH RECONFIGURABLE FORMAT

(75) Inventor: Scott C. Harris, San Diego, CA (US)

(73) Assignee: Harris Technology, LLC, Rancho Santa Fe, CA (US)

(*) Notice: Subject to any disclaimer, the term of this patent is extended or adjusted under 35 U.S.C. 154(b) by 3904 days.

(21) Appl. No.: 10/065,327

(22) Filed: Oct. 3, 2002

(65) Prior Publication Data

US 2003/0078991 A1    Apr. 24, 2003

Related U.S. Application Data

(63) Continuation-in-part of application No. 09/682,853, filed on Oct. 24, 2001, now abandoned.

(51) Int. Cl.
G06Q 40/00    (2012.01)

(52) U.S. Cl.
USPC .............................................. 705/40; 705/35

(58) Field of Classification Search
USPC ..................................................... 705/35–40
See application file for complete search history.

(56) References Cited

U.S. PATENT DOCUMENTS

| | | | |
|---|---|---|---|
| 5,826,241 A | 10/1998 | Stein et al. | |
| 5,835,896 A | 11/1998 | Fisher et al. | |
| 5,920,847 A | 7/1999 | Kolling et al. | |
| 6,064,990 A | 5/2000 | Goldsmith | |
| 6,185,542 B1 | 2/2001 | Moran et al. | |
| 6,363,414 B1 | 3/2002 | Nicholls et al. | |
| 6,366,891 B1 | 4/2002 | Feinberg | |
| 6,405,204 B1 | 6/2002 | Baker et al. | |
| 6,408,282 B1 | 6/2002 | Buist | |
| 6,438,578 B1 | 8/2002 | Schmid et al. | |
| 6,480,711 B1 | 11/2002 | Guedalia | |
| 7,058,582 B2 | 6/2006 | Powell | |
| 7,167,844 B1* | 1/2007 | Leong et al. | 705/80 |
| 2001/0056395 A1 | 12/2001 | Khan | |
| 2002/0026396 A1 | 2/2002 | Dent et al. | |
| 2002/0029183 A1* | 3/2002 | Vlahoplus et al. | 705/37 |
| 2002/0065693 A1 | 5/2002 | Hattori et al. | |
| 2002/0068991 A1* | 6/2002 | Fitzsimmons, Jr. | 700/214 |
| 2002/0069253 A1 | 6/2002 | Kazui et al. | |
| 2002/0071136 A1 | 6/2002 | Bobrow et al. | |
| 2002/0073008 A1* | 6/2002 | Dutta et al. | 705/37 |
| 2002/0099735 A1 | 7/2002 | Schroeder et al. | |
| 2002/0112009 A1 | 8/2002 | Capers et al. | |
| 2002/0165817 A1 | 11/2002 | Rackson et al. | |
| 2002/0177453 A1 | 11/2002 | Chen et al. | |
| 2003/0065805 A1 | 4/2003 | Barnes | |

* cited by examiner

*Primary Examiner* — Thu Thao Havan
(74) *Attorney, Agent, or Firm* — Law Office of Scott C. Harris, Inc.

(57) ABSTRACT

A number of different aspects that can be carried out on an Internet site and prestored sequences of actions or scripts. The scripts can be formed by monitoring the actions of a user and storing their actions in a memory. That sequence of keystrokes can later be used to access the same web site and obtain updated information. For example, this may be used to obtain bank balances, ongoing actions such as bidding systems, stocks, and the lighting. Different ways of forming the "script" that executes this information are described. In one aspect, the script validates an encryption sequence and lights and indicator on who the handheld computer indicating that the encryption has been validating. In another aspect, the handheld provides information from effectively an electronic Yellow Pages.

27 Claims, 9 Drawing Sheets

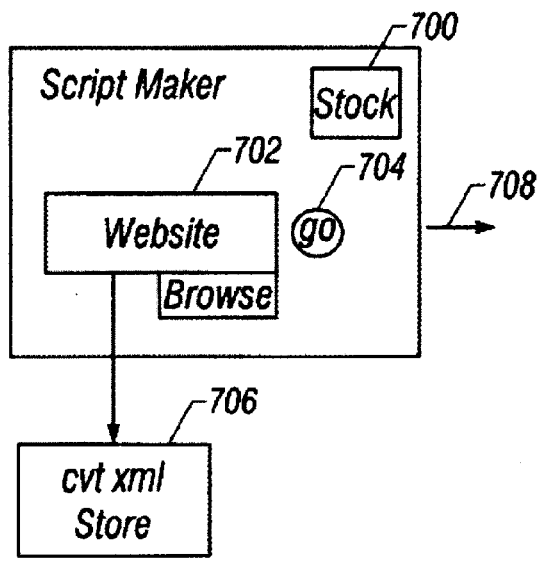
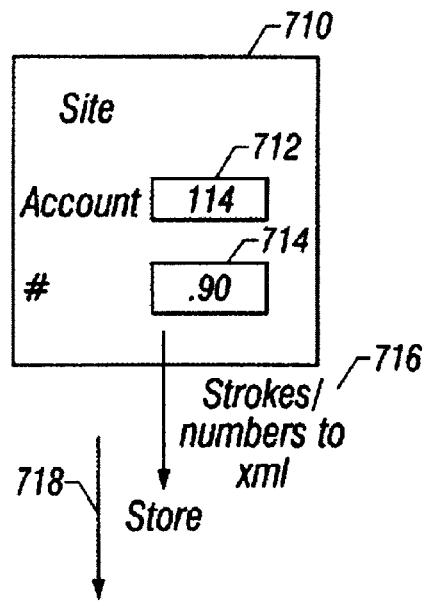
*FIG. 7A*  *FIG. 7B*
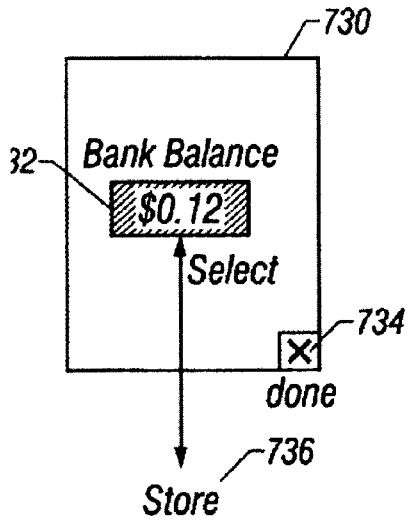
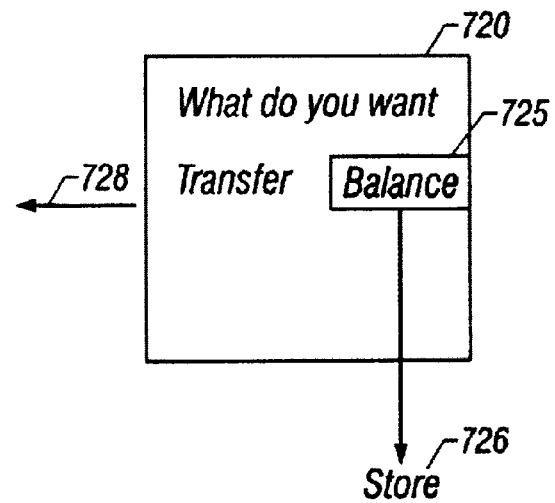
*FIG. 7D*  *FIG. 7C*
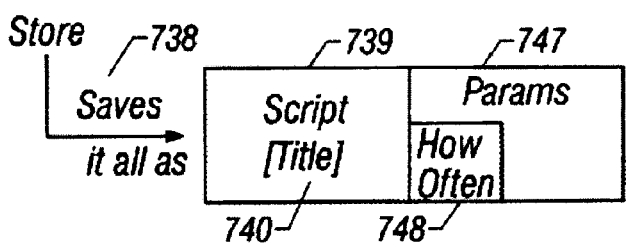
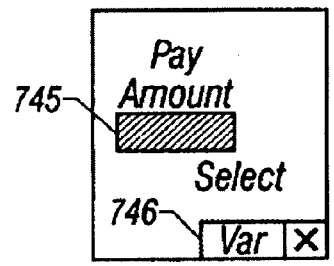
*FIG. 7E*  *FIG. 7F*

WEB BASED COMMUNICATION OF INFORMATION WITH RECONFIGURABLE FORMAT

CROSS REFERENCE TO RELATED APPLICATIONS

This is a continuation-in-part of U.S. Ser. No. 09/682,853, filed Oct. 24, 2001.

BACKGROUND OF INVENTION

The Internet is a very powerful tool for transferring and obtaining information. Many new applications have become available since the Internet's advent. Just to name a few, these include electronic placement of bids over the Internet, electronic determination of the user's bank balance over the Internet, automatic registration for various services over the Internet, electronic shopping with an electronic shopping cart, and various, virtually uncountable numbers, of others.

For all of the power of the Internet, it also has significant limitations. The language of the Internet, HTML in its various flavors, can only be properly interpreted by a device which is capable of reading HTML. Many different plug-ins and additional programs can be used, and are basically used as HTML windows. For example, the various flavors of Java, can enhance the Internet environment. Many companies have produced streaming video applications, such as shockwave and/or animation applications. These are basically shown as an associated application to the HTML.

Much of the customization which has been done on the Internet is done for the purpose of enabling more complexity, and more items to be shown over the Internet. However, browsing from a hand-held device has become more popular. For example, the Internet can be browsed from a cellular phone, from a PDA such as a palm VII, or other thin clients. Typically the way in which this is done is by forming a special web page for those thin clients, which runs a scaled-down flavor of HTML that is optimized for such thin clients. Only those special web pages which are optimized in this way can be effectively viewed. For example, any attempt to use such a system to browse a normal, unoptimized web page, may cause an error, or may cause the information to be displayed in a way which makes it very difficult to effectively understand.

Other interactive hand-held devices, such as Blackberry devices and other devices which are optimized for e-mail and text messaging only, have no effective way to interact with the Internet. Therefore, while these devices are interactive in the sense that they can communicate and receive information via Internet-like channels, they can only receive information of a specified type.

SUMMARY OF INVENTION

The present application teaches a system of using an Internet-aware service to form a conduit between the Internet and another device which may be a hand-held device or any other thin client, or even a regular client.

In one embodiment, a client which is capable of interactive communication, and more preferably a hand-held device, may be used to obtain specified kinds of information from the Internet. Requests are sent to a service. The service can be any computer which is capable of receiving requests, reformatting then into a specified form that is required by a web server, sending it, receiving the response, and reformatting that response.

The service will typically receive requests in some kind of e-mail format, e.g. plain text. The service may return the responses to the requests in either plain text or some flavor of XML. The service can its self be a web server or any other kind of service, and the service carries out translation in a way that enables obtaining information from the Internet, retranslating it, and sending the information to the hand-held device.

In another embodiment, the hand-held device may include the user's personal information, and which can be used to allow identification, e.g. login, to a specified Internet site.

Another embodiment describes effectively do-it-yourself Internet, where a service is used to rearrange the content and information in an Internet page, and to display the new information to the user.

BRIEF DESCRIPTION OF DRAWINGS

These and other aspects will now be described in detail with reference to the accompanying drawings, wherein:

FIG. 7A-7F shows the various functions of forming a script from a web site access;

DETAILED DESCRIPTION

Figure 1:
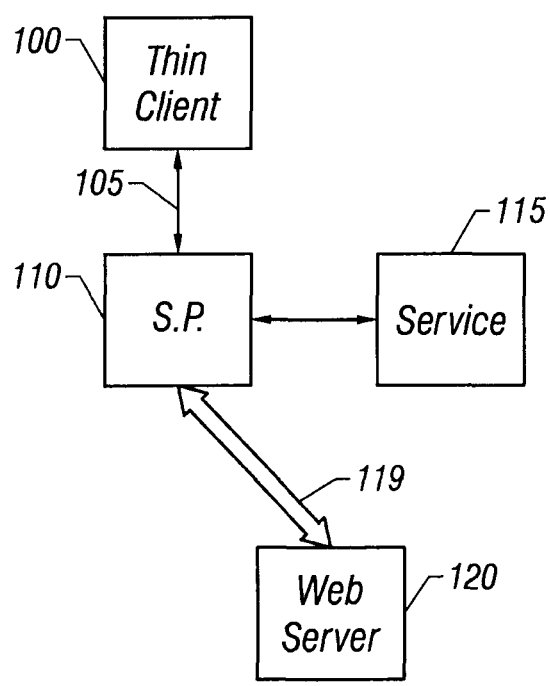
FIG. 1 shows a diagram of flow between devices according to an embodiment.

An overall flow of the communication between the various devices is shown in FIG. 1. According to the system of FIG. 1, a service is used to translate information between a hand-held device 100, and a web server 120. The web server 120 is connected to the Internet shown as 119, but more generally, can be connected to any publicly available source of information.

PDA/pager 100 can be any thin client which includes interactive capabilities. For example, it may be an e-mail pager, a cellular telephone, or any other device which is capable of interactively communicating. In one embodiment, the device may be limited to text messaging. The thin client 100 communicates as conventional over a channel 105 to a service provider shown generically as 110. The service provider can be, in the case of a cellular telephone, for example, a provider that operates as part of the cellular telephone system. The service provider also communicates with a service shown as 115. The service can be a conventional Web service or other subscription service, or simply can be an interfacing program that is running on a computer at the service provider's location. The service carries out certain translations, in order to communicate between the thin client, and the Web server 120. The service provider also includes a connection to the Internet, as conventional for such service providers, since they conventionally obtain information such as e-mail and Web content from the Internet.

While the embodiment describes the client 100 as being a "thin" client, it should be understood that this same flow can be carried out with other clients.

Figure 2:
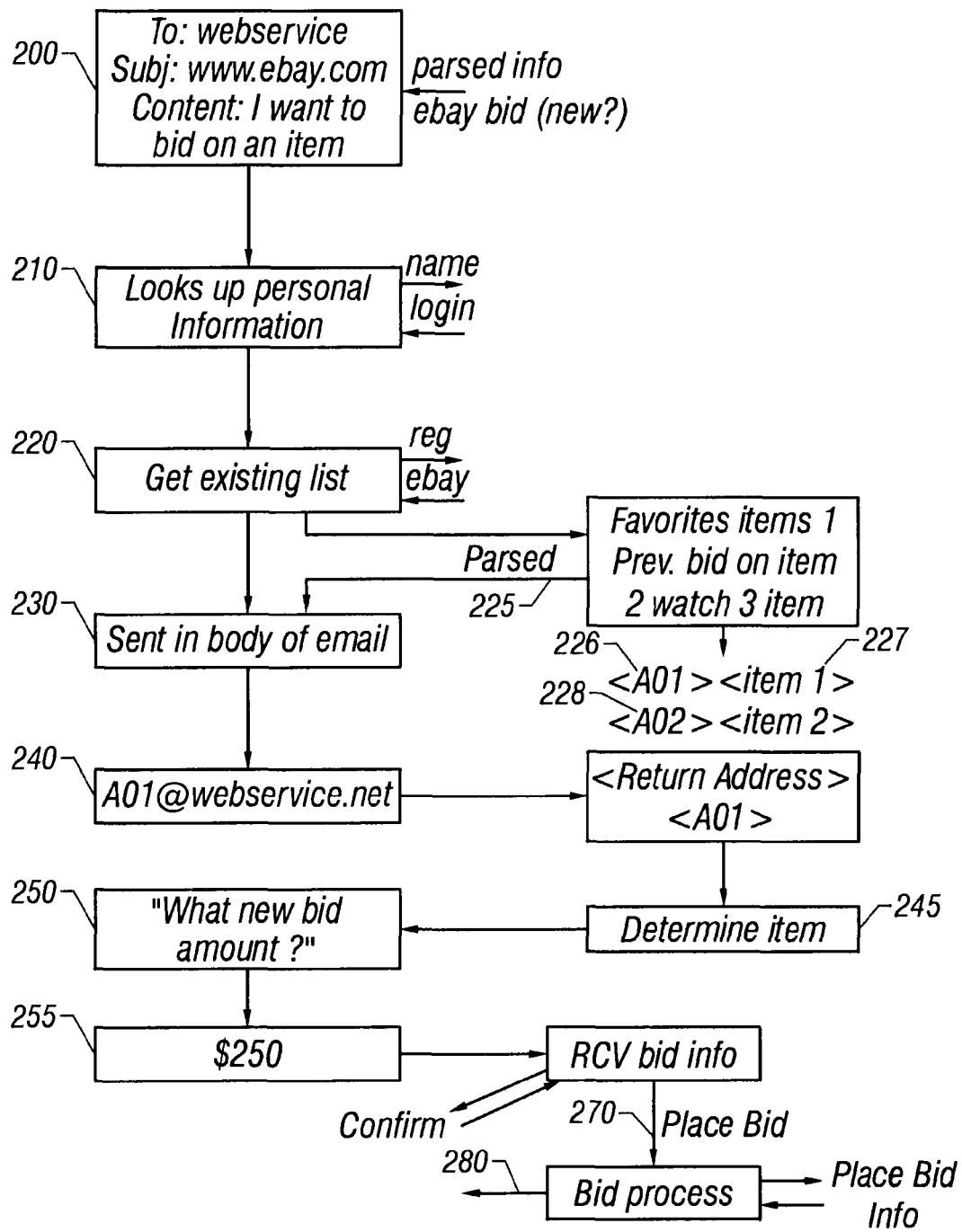
FIG. 2 shows a flowchart of an embodiment to query an auction type website using a service.
Figure 3:
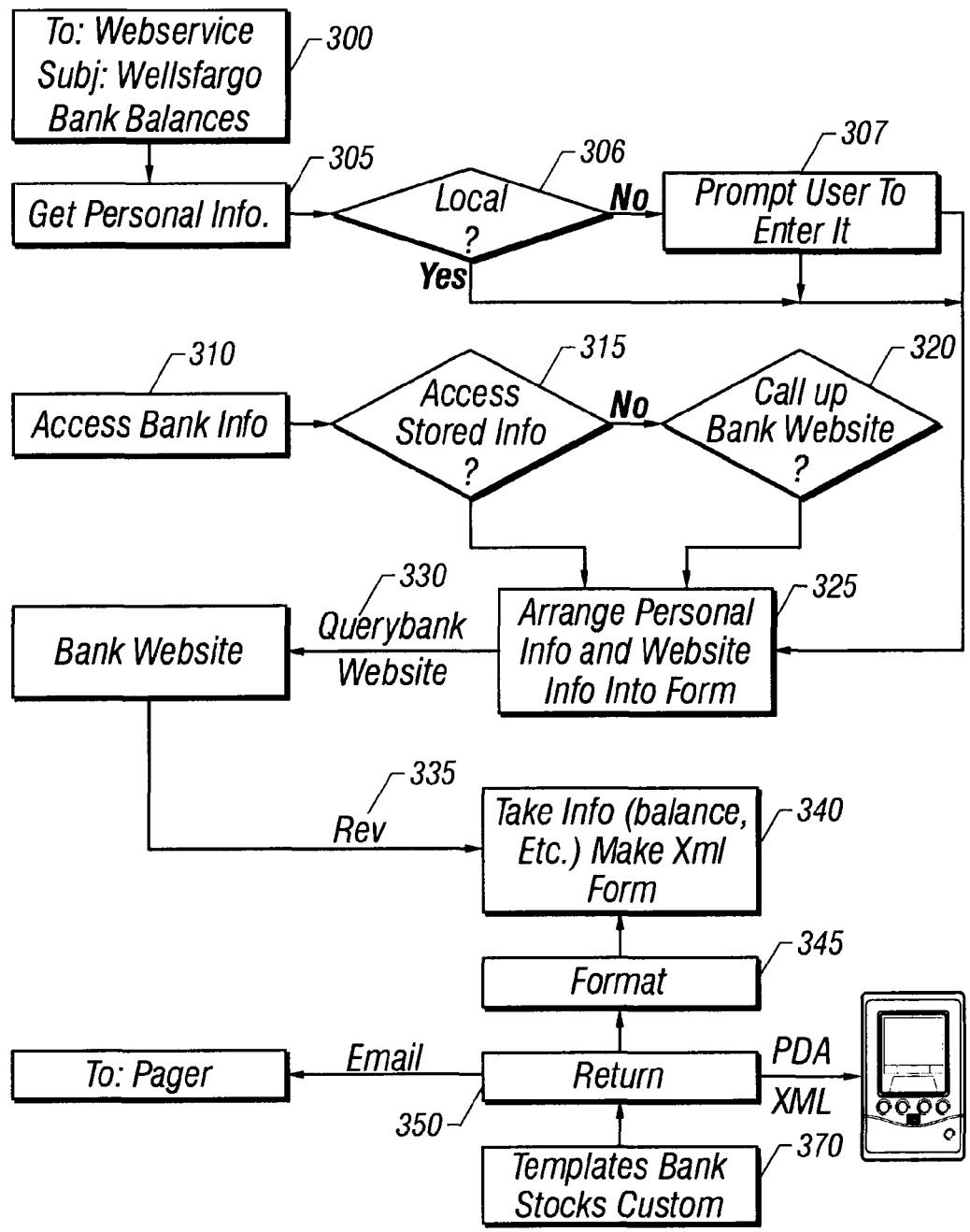
FIG. 3 shows a flowchart of operation to query a bank.

The operation of the system is shown in the flowchart of FIG. 2. FIG. 2 represents the flowchart for a system where the client 100 is an e-mail pager, and the system is being used to change or make a bid on an electronic auction site such as eBay. These same operations, however, would be carried out to exchange any kind of information with any kind of website.

At 200, the user makes the decision that they want to change or place an electronic bid. In order to its start the process, at 200 the user sends an e-mail to a special address, here called simply "Web Service" with content in either or both of the subject line and/or the body of the e-mail indicating the website and what the user wants. The detail may be written in plain English, and in this embodiment is parsed by a keyword recognition system. More generally, the system may parse the plain English words using any kind of plain English recognition system.

The keyword recognition system which is used herein takes advantage of the fact that only certain allowable operations may be carried out in this way. For example, the e-mail may be sent to a special address that only accepts e-mails about operations to be carried out by the service. Only a limited number of operations may be carried out, for example, specified Web sites, specified banks, stocks, and others.

Therefore, when the e-mail says "I want to place a bid on eBay", then the system can parse different words from this e-mail. First, it can easily match the word eBay, and once doing that, it knows that there are only certain things that can be done on eBay. For example, a user may be allowed to browse eBay categories, do a search on eBay by keyword, check on a previously made bid, or make a bid.

By looking at the remainder of the keywords, once recognizing "eBay", and noting the categories above (browse, search, check bid, make bid, up a bid where I've been outbid), the system sees the word bid. This again narrows down the options; the allowable things the user can do are either check on a bid or make a bid.

The system may store a number of different ways of saying each one. For example, the system may store place a bid, make a bid, bid on, to represent the make a bid option. The system may store check (on) bid, bid status, how is my bid doing, for the other. The system then tries to match the words of the email, to the words that correspond to one of the allowed actions. The best correspondence is selected, if possible.

Also stored within the database is a probability, for the specific user, of what they will want to do. This may be based on the user's previous actions. For example, the user may 77 percent of the time, want to place a bid when they use the word bid. The system may also store global statistics of this type, in case the user's specific statistics are not available. These statistics may be used when the system cannot determine exactly what to do, as a basis for an educated guess.

For any of these, the system returns an e-mail saying you want to place a bid on eBay, is this correct? The user replies with yes or no to indicate whether the system has properly understood the command. If the user answers no, then the system may return a numbered list of things the user can do, based on its parsing. The user can then reply with a number, for example.

At 210, the thin client, here a pager, looks up personal information that is stored within the pager database. For example, a PDA or other pager may include a storage repository for information. More generally, the client may be any interactive-capable client that is capable of sending and receiving information, and displaying results to a user. The send and receive need not be in real time; that is; the receive may be delayed relative to the send by some amount.

This information may be either local, or stored on an on-line server such as "www.myPalm.com" or other. Alternatively, if personal information is not stored, then an additional interactive operation can be carried out similar to those disclosed below. In any case, this operation returns the user's name, login information (such as password) and other registration information necessary for the specified site, here eBay.

The pager will request eBay for a list of its current status. At 220, the service sends an e-mail to the eBay site, asking for stored information. Note that this step is done totally independent of the thin client. The service itself is interacting with the website, and receiving information that will be later reformatted in order to send to the thin client. The existing list of current status is received from eBay, and parsed into its different parts. For example, the favorites list, the items previously bid on list and the watch list may all be included. If the user, under the "content" item, has specified more detail about what they want, then this may narrow down what is actually retrieved, in which case possibly less than all of this information may be accessed.

Other commands of this type may be, for example, "I want to bid on an item that is on my watchlist. This may be parsed to retrieve the contents of the watchlist. Alternatively, if the item says, I want to bid on an item I've previously been outbid on, then the current bid list may be returned, or only items on the current bid list where the requesting party is not currently the winner.

Again, the information is requested by the service, and then received by the service. The service may parse and format this information in any desired way. Here, the service may parse the information at 225 into a text list, with each item having a special number that corresponds to a session ID. The number should preferably be a relatively short number, since the user will need to use this number to take further action on one of the items in the text list. In the embodiment shown, the session ID may be a01 referring to a first item, a02 referring to a second item, and so on. The actual content of the fields associated with item 1 may in fact be the description of the items, received from eBay. Similarly, other item numbers such as a03 may be provided. This list, again in text form, is sent as the body of an e-mail to the e-mail pager at 230. This embodiment describes using alphanumerics to describe the items, providing approximately 503 different possibilities. This may be far more than will ever be necessary, so long as the return address can be used to determine which session is being referred to.

Again, each item has a number. In order to select one of these numbers, the user sends an e-mail back to the Web service. This can be a reply to the previously-sent e-mail, or can be simply sent to an address related to numbers in the previously-sent e-mail. For example, the e-mail may be sent to the address IDnumber@Webservice.net, here this may be the specific ID number a01 being used. The web server looks at the return address, to determine the meaning of the session ID. With the return address, and the session ID, the web service can unambiguously determine the item to be bid on. From this, the web service determines the item at 245, and again sends an e-mail to the user requesting further details.

As part of the information received at 220, the Web service may receive existing bid amounts and other details necessary for placing the bid. The system might not have reported that information previously, but may still store it. Alternatively, this can be individually determined at 245.

Having gotten to this point, and the user selecting an item where a bid was made but now is no longer the highest bid, the system may conclude that the user intends to up their bid. An e-mail is sent back to the pager at 250 that simply says "what new bid amount? The user responds with a dollar number at 255 which is again sent to the Web service. The Web service again receives this number, which may or may not include the session ID number (here a01) in be subject line. This tells the Web service that the user wants to place a bid of $xxx on the item number a01. The Web service now has all it needs it knows the item, the amount, and the user's personal identification information. An optional confirmation may be carried out at 260 where the Web service says are you sure you want to place a bid of $xxx on <item one>?, and waits for a yes or no by e-mail. If so, the system places the bid at 270 with eBay, and once receiving confirmation that the bid has been placed, reports that confirmation at 280.

On the eBay site, simply placing the bid does not mean that your bid is necessarily high enough. For example, the bid of xxx might not be higher then existing bids which already exist in the system. Therefore, the results of the bid, such as bid high enough or bid not high enough are reported at 280. This may be simply reported as "you are the current high bidder" or your bid has been placed but was not high enough.

The service may also carry out other functions once the bid is placed in this way. For example, the service may monitor eBay at increments of say 5 minutes, 15 minutes, or one hour, looking for outbid notifications. Since the operation is carried out with the server, other timed services may also be carried out. For example, the user may send the service a message saying "check the bid at every five minute intervals, and report to me." The system can parse this out based on any real time is to parsing system, and decide what it's been told. The server can easily check the bid every five minutes, and send an e-mail to the users interactive device.

Again, since the service is running on a computer, any function that can be programmed in any language can also be carried out. Therefore, the message sent to the service can be much more complex. For example, the message can say "check the bid at every five minute intervals, and report to me only if the bid has changed." Any different combination of possibilities can also be programmed in this way. An advantage is that all of the user interface is carried out using plain text operations.

The above has described placing a bid on ebay, but it should be understood that this system can also be used for many other purposes, including buying virtually any product on the Internet or others. Another example is for using this system to check on stock prices. An example command that could be sent to the service says "check on my usual stocks today, and report to me if any of them changed by more than 5 percent". A list of usual stocks can be stored in either the service or in the interactive device. The service can check on these for example at 10 minute intervals, and report by e-mail only those stocks which have changed. This shows the power of the format conversion system used by the present system. Rather than point and click, this system allows effectively plain language commands to be made.

An important advantage is allowed by the service that carries out the translation between the client and the actual web server that has the information. By providing this server, the client can access any source of information over any publicly available network, without actually having a device that can access the server.

Another embodiment is disclosed herein of using this system to obtain a bank balance over the Internet. In this embodiment, the operation is shown for use with either a text based device such as an e-mail pager, or with a device that is capable of Internet browsing.

At 300, an initial e-mail is sent to the Web service, the subject being bank balance. The system obtains the user's personal information at 305. This can be personal information that is already stored in the device, or entered information. At 306, the system determines if the information is stored locally, and if so flow continues. If not, the user is prompted to enter this information at 307.

At 310, the bank information is accessed, by the service accessing the web page associated with the bank. In order to obtain a bank balance, the user must send specialized information to the bank using their specialized web page. The web page may be stored, as a cached web page, and if so it is accessed at 315. If the web page is not stored at 315, the bank's website is called up at 320. In either case, the result is the web page, and the user's personal information such as account numbers, passwords and the like. The term "password" as used throughout this specification may include any personal identifying information including a password, a personal identification number, or some other identifying information.

At 325, the Web service arranges all of this, that is the personal information and the web page information, into a form of the specified type and sends this form to query the bank's website at 330. The bank's website once queried at 330, returns the desired information at 335. Presumably the desired information is on the first page returned, although the process can be continued multiple times if an additional page of information is necessary.

At 340 the received information is obtained in the HTML form and is reformatted into an XML form. A desired format for the XML form is applied at 345, which will be returned at 350. If the returning is to a text based device, control passes to the left in the flowchart, and text information is sent in a specified form. If the returning is to a browser type device, such as a PDA or a full-blown computer, control passes to the right in the flowchart, and the information may be sent in an XML form.

Figure 5:
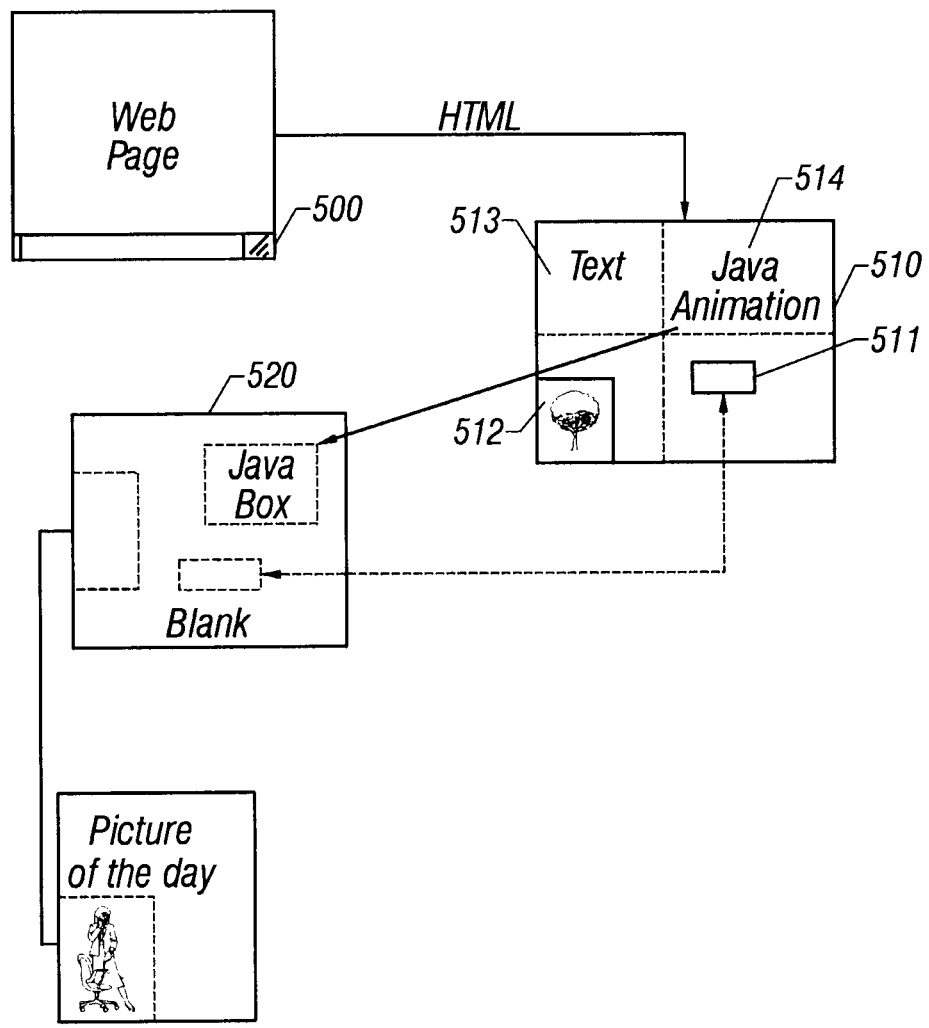
FIG. 5 shows a system of do it yourself formatting of internet content.

Information for both of the returned forms may be stored in the templates 370. Various forms of specified templates may be stored. For example, a template for a bank may be stored, for stocks, and also custom templates. Each of the templates describes the preferred format for the way in which information is returned. The template may be very simple; for example, for a bank the template may simply say "your balance is xxx, of which yyy is available balance". The variables in these templates may be filled in from the information obtained from the Internet site. The embodiment disclosed with reference to FIG. 5 shows how custom templates can be made.

Since this system obtains the raw information and formats it according to a template, a limited form Internet browsing device such as a PDA can effectively browser virtually any site, even those sites which are not available in reduced bandwidth/information versions. The effective or desired information on those sites is located. That information may be conveyed to the user as part of one of the forms/templates.

Figure 4:
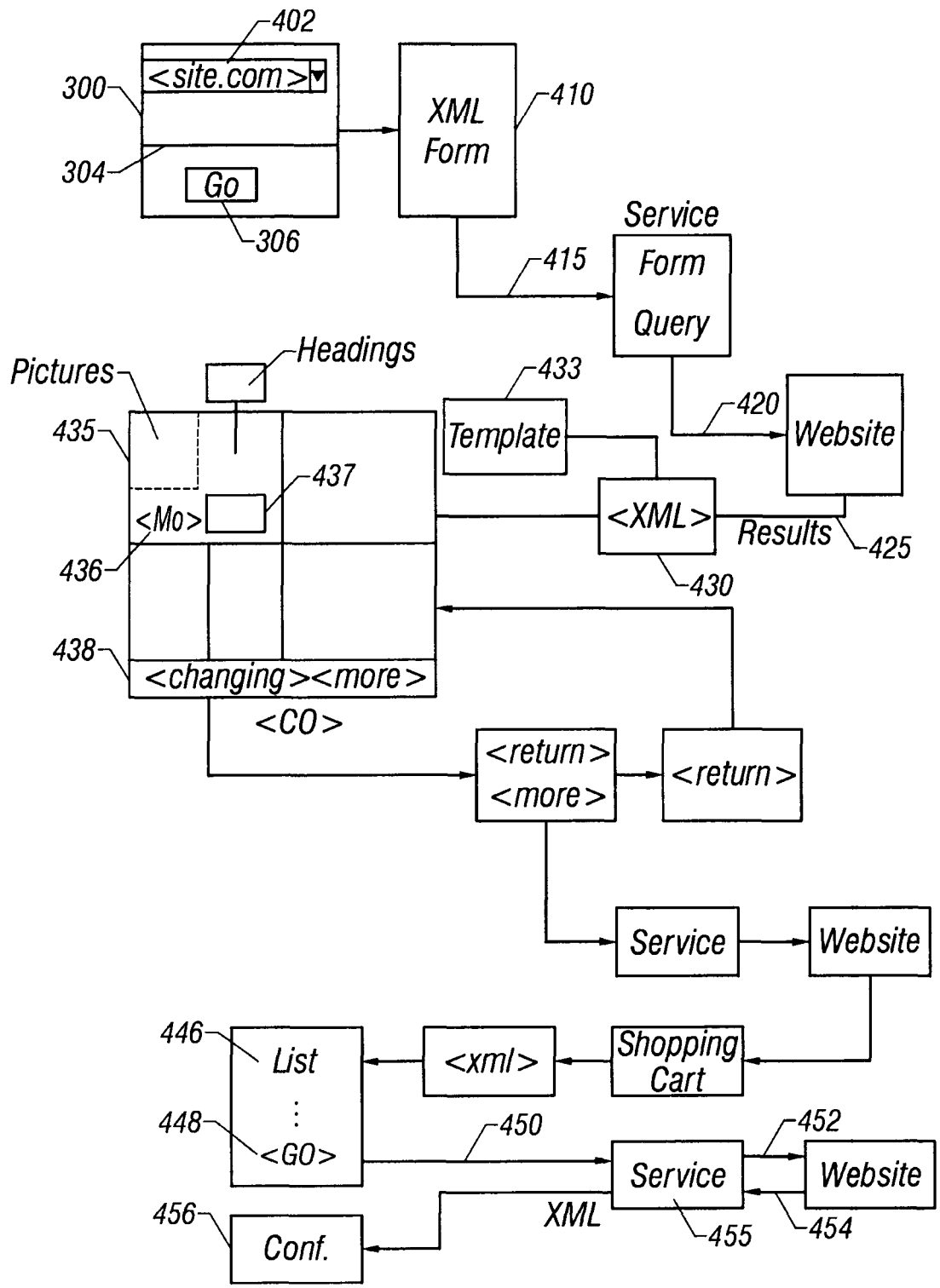
FIG. 4 shows a flowchart of using this system with a general ecommerce site.

Another embodiment, shown with reference to FIG. 4, is more optimized for use in a browsing type PDA, and can be used with the same features to carry out electronic shopping such as with a shopping basket on a site. Many of the general principles described above can be used. A generalized shopping form is shown as 400 includes the site name, which can be selectable from a list 402. The user selects the site name from the list, or types in their own desired site name. The user then types in the search term and then actuates the execute key 406. This causes the PDA to form the information into an XML (or HTML) form at 410. The XML form is sent to the service at 415, which translates the form into a query in a format that emulates the user requesting specified information from the specified website. This query is sent to the specified website at 420. The website then returns results at 425. These results are again parsed into an XML form at 430, using one of the specified templates shown as 433. For purchasing an object, the template may be of the general form shown as 435 where one, two or four objects are located on the screen with reduced size pictures of each, the heading information for each, and the rest of the information for the object simply contained in an XML link marked <more> shown as link 436. If the user selects the more link, then additional information that was downloaded from the website is returned. Each returned page will similarly have a more link until reaching the last page at which only the "return" link is shown. The return link returns the user to the basic view 435. In any of the objects, main view, an "add to cart" icon 437 may also be viewed. In this embodiment, along the bottom of the view, a toolbar 438 allows selecting more results or changing the view. The changing the view for example may select a different format from the templates. Selecting this different format causes all further actions for the similar kind of site to be carried out using the new selected format.

The user can also signify checkout in the toolbar. When the user signifies checkout, the information from the service representing the simulated shopping cart is sent to the website, initiating the checkout process. The website may return conventional shopping cart information at 442, which is again parsed in an XML format at 444 into a list 446 that can be more easily displayed on the handheld. When the user signifies go, (448) all of the user's personal information is transmitted at 450 to the service, e.g. information already stored in the handheld. Alternatively, the user may be prompted for this information. The service sends the information to the website at 452, which confirms the buy. The confirmation is returned to the service at 454, converted to an XML form at 455, formatted and sent back as a confirmation 456.

FIG. 5 shows yet another alternative system which is usable not only in thin clients but also in relatively more powerful clients. In this embodiment, a web page may be customized by a user. The web page customization software may effectively be a plug-in to the HTML reader that places a toolbar at the bottom. One item on this toolbar is a customized link shown as 500. Upon executing the customized link 500, the computer that is running the software analyzes the HTML page and parses it into different parts. 510 shows how the different parts of the page may be parsed separately. The parsed portions may include for example fill in values such as 511, drawing parts such as 512, and fixed text such as 513 as well as plug-ins, e.g. Java or animations shown as 514. The system also brings out a blank page which may be located side-by-side with the parsed page, or may be located in a separate window. In this embodiment, each HTML object may be separately selected and moved. For example, if the variable 511 includes information such as a bank balance, the user can select this with their cursor, and drag it, as shown, to a desired area on the blank page. This makes an XML form which includes information from the other page. Any number of web pages can be combined together to form the different composite parts of the composite web page 520.

The composite web page may be continually updated. In order to obtain any of the various parts, the system may call up the original web page that produced the part, obtain the web page, take the portion of the web page corresponding to the selected part, and form the composite web page for eventual display. All of this may be done in the background. For example, the system may open all of these pages as real windows in the background, view the source, find the right part, import the right part, and then close the windows once the composite web page has been formed.

What this means, therefore, is that a number of windows may be dynamically opened, as background windows. Once the system has obtained the desired parts from those windows, they may be automatically close, with only the desired part being displayed on the composite page.

Effectively this provides do-it-yourself Internet, where parts of an HTML page are obtained, and those parts are used to form a composite form which is eventually displayed. In this embodiment, the composite form may be in XML, since that is easy to configure.

The above has disclosed only certain limited kinds of thin clients. It should be understood that other clients, including personal computers, may be used.

The above has described the client being a machine such as a pager or the like. However, these same techniques may be carried out over a voice telephone type network. For the example, the user may enter their information either by touch-tone keys, or by voice recognition. Systems of obtaining information from a telephone are well-known, such as bank by telephone type systems. Again, however, and analogously to the above, all of these require that be banks network have installed characteristics. In the present system, the telephone communication is with the equivalent of the service, who places a query to the bank or website. The website or bank must have some capability of being accessed. However, by using this service, the user can call, and using voice prompts and voice commands place a bid on eBay, obtain a bank balance, or anything else like that.

This system may also be used for obtaining many other kinds of information, basically too innumerable to specifically recite herein. For example, this system may be used to obtain current news stories, by sending the service a query "what are the top news stories?". Any kind of query of this type may be answered.

Figure 6:
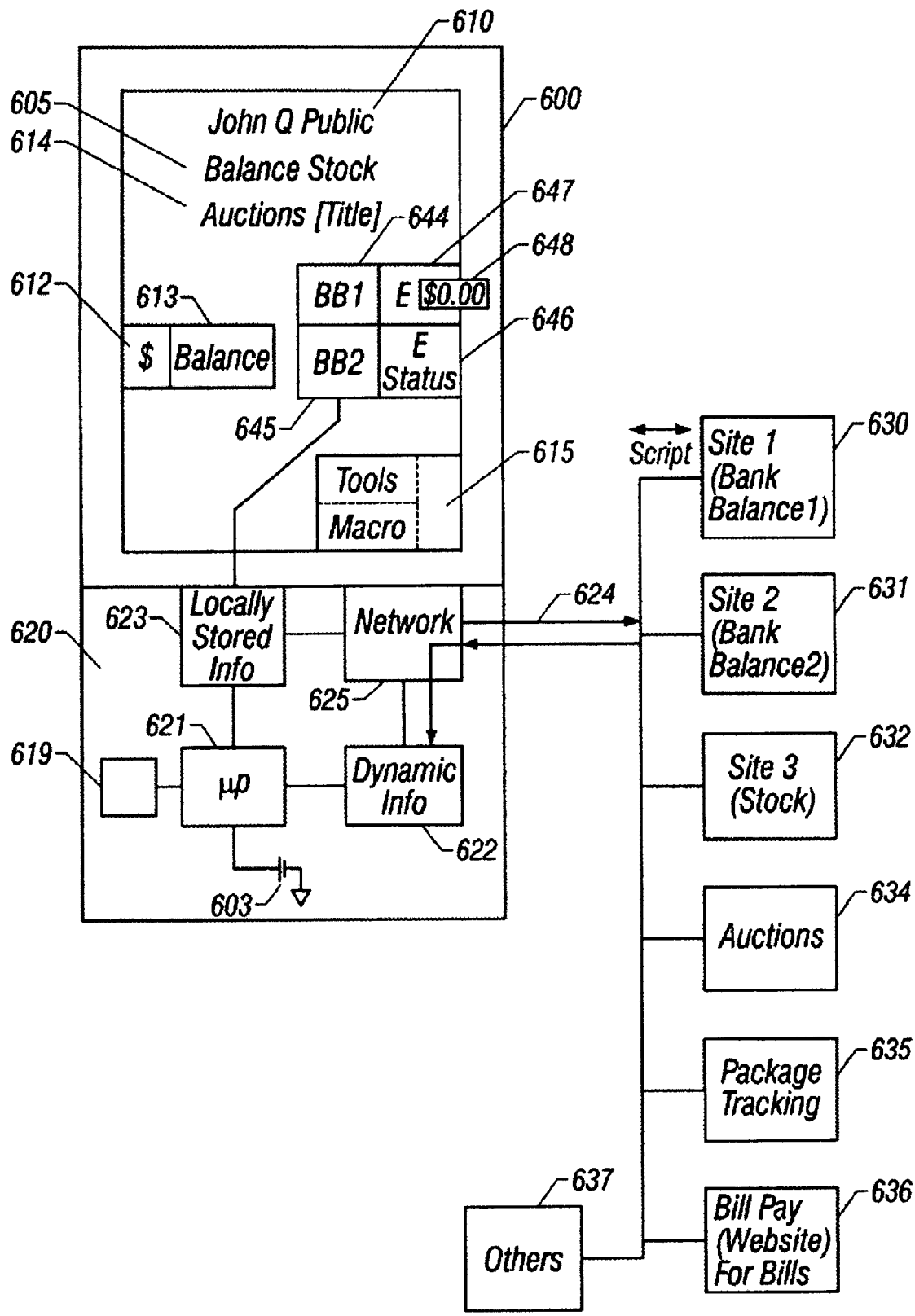
FIG. 6 shows an embodiment of a hand-held deck that can access various web sites.

The above has described how Internet content can be obtained and displayed in and formatted into a desired format such that parts and content from the Internet can be formatted as desired by a user. This can be used in any type of personal computer, including a hand-held personal computer, e.g. a personal digital assistant (PDA) or cell phone. There is no lower limit on the physical size of such handhelds. In recent times, in fact, the size of such handhelds has reduced. The embodiment of FIG. 6 is intended for use with a hand-held and especially in a reduced size hand-held. For example, the hand-held may be the size and thickness of a conventional credit card, and may be a so-called smart credit card. The device may include a display which can be used to display information.

The apparatus is shown in FIG. 6. A portable computer housing 600 is formed with a display 605 that includes areas for different kinds of information. A first area 610 includes personal information, such as the user's name and other desired personal information. Alternatively, the user may prefer not to display any personal information. A second area 612 displays dynamic information, that is, information that periodically changes. This information may be obtained over an information link, for example. A toolbar area 615 may also be provided which provides access to tools in a conventional way. In addition, icons may be provided for programs and other conventional type display functions of a hand-held.

The hand-held also includes a hardware section 620 which includes memory 619 and a processor 621 driven by a battery 603. The processor 621 may control the flow of information according to a stored program.

Two different categories of information are shown as locally stored information 623 and dynamic information 222. These are shown as being stored in two different memory sections although the storage may be physically within the same memory. Locally stored information 623 includes personal information which is created by the user, and may change but in general is fairly static. The dynamic information 622 is received over the information network 624. A network communicator 625 connects to the information network. The network communicator may be for example a wired or wireless modem, or may be any other type of communication device.

In an embodiment, the information network 624 may be the Internet. However, any other network or any other available source of information can be connected to network channel 624.

Any source of information that is available over the Internet or any other network can be accessed via the network channel 624. For example, an Internet web site can be accessed via a prestored sequence of information that interacts with the web site, here called a script. This script effectively allows the information that is stored in local to be used to access the Internet web site. The contents of the web site, that is certain information from the web site, may be returned.

Exemplary different kinds of sites that can be accessed are shown may include banks, e.g. to obtain bank balances such as 630 and 631. Note that different scripts can access different bank sites and obtain access to different accounts, e.g. bank balances, from those different banks. An unlimited number of accounts can be accessed in this way.

Each script may have an icon, and/or parameter fill in. For example, icon 644 may select execution of script 630; icon 645 may select execution of script 631. The result, e.g. the balance shown at 612 may be each of those balances individually, or may be a combination of the different information from the different web sites in some predetermined way. For example, the balance 613 may be a combination of balance 1 from site 630 added to balance 2 from site 631, in which case icon 644 may be a script that requests information from both bank 1 and bank 2, and then adds them.

Other sites that can be accessed include stock portfolios site 632, and online auction sites such as ebay 634. For example, when accessing an online auction site such as ebay, the system may automatically obtain the status of currently pending bids, and the status of items that are currently being sold, shown as a status icon 646. The system may also include the capability of allowing the user to modify some aspect of the auction. For example, the user may be able to modify their maximum bid on the items shown as icon 647. This icon requires entry of an amount 648 prior to selecting the icon.

For items that have not yet been bid on, that is items on the user's "watch list", the user may be allowed to place a bid and to get information such as time until the auction ends. Each of the different actions on each of the different sites may have its own icon, that can be selected on the display screen 605. For example, when the status icon 646 is selected, the action is a status check on a specified site, and the user is provided with the most recent information that is available. If a connection to the Internet is available at the time that the icon is selected, then the information may be updated at that time. The user can make any of the allowable changes, and then those changes are later sent back to the auction site 634, either the next time that a connection is available, or on a time schedule, or immediately.

Another alternative may provide a single icon for all actions that can occur on a specified site. Selecting that single icon brings up a grouping of icons, showing all of the different actions, such as increase a specified bid, see status of all bids, and the like. In addition, that single icon may automatically access status, and provide a list of current bids, with the ability to modify any of those bids.

While the above has referred to the selectable items as being icons, these need not be graphical icons. For example, the icons can simply be text or graphics or any icons or items which denote to a user that the selection of that area on the screen is associated with some action or series of actions as described above. These are referred to herein as a icons, it being understood that the area of the screen is simply labeled in some way with some indication that selecting that area will cause some action.

Site 635 enables package tracking, for example post office tracking or UPS tracking.

Site 636 represents one of the user bills, for example a credit card. The daily balance on this credit card may be obtained, and the date that a payment is due may also be obtained. The user can obtain a daily balance. The user can also pay part or all of the balance from either/any of their associated bank accounts.

As described herein, a script may be written for any purpose including paying an entered amount from one bank account to another bill or retrieving an amount from one site (e.g. a bill site) and paying that amount from another site (e.g. a bank site). Other sites are shown at 637.

In operation, a script maker is available from the tools menu 615. This script maker follows the basic flow shown in FIGS. 7A-7F.

In FIG. 7A, the user executes the start icon 700 and types or browses for a web site address for access to begin 702. The browse operation obtains a live internet connection, and allows finding the web site on the Internet. The user than executes the "go" icon 704.

The script maker is executed as a graphical Web browser. The web site 702, and the command to access that web site, is converted into XML or HTML format, and stored at 706. This is the first operation of the formation of the script. Once the commands are formed in this way, the web site will react to the command to provide the desired content. In addition, the web site address is sent at 708, and the contents of the web site are received at 710 and displayed on the screen as FIG. 7B.

The user enters their personal information to log on to the web site in the usual way. For example, for a bank account site shown, the user may enter their account No. 712, and PIN or passwords 714. The position of data entry on the screen and numbers/strokes are again converted into XML at 716 and stored. The same information is also sent to the web site at 718. The web site responds by returning the next screen shown at 720 in FIG. 7C. This returned screen may provide capability for the user to select one of a number of different options including transferring between accounts, obtaining bank balance, paying bills, and the like. For the case of obtaining a bank balance, the user selects the icon 725, and again this is stored at 726. The signal representing the selection is also sent at 728, and the remote website responsively returns the screen shown at 730 in FIG. 7D. This screen includes the bank balance, along with other information. At this point, the user selects the bank balance 732, using the cursor. The user also activates an icon 734 indicating that the script formation is complete. Again, this information is stored at 736.

The entire sequence of information is then saved at 738 as a script 739. The user enters a title for the script shown as 740. When this script is saved, the system also produces an icon for this script on the screen. Later execution of this title icon executes this script.

This script may also include parameters that can be entered. For example, for the case of entering a bid or paying a bill, the user may be allowed to enter parameters such as the amount of the bill to be paid. For entry of a parameter during the formation of the script, the user selects the variable, and flags it with a variable either by name or number. For example, in FIG. 7F, a screen is shown which may include how much of a payment amount to make. The user selects the area for the payment amount shown as 745, and flags it as a variable shown as 746. A pop-up window may be displayed which prompts the user to enter a name for the variable. That variable becomes one of the parameters 747 shown as the executable script. Another parameter may select how often the information should be obtained. The length may include continuous updates, update every few hours, or other similar update parameters.

Figure 8:
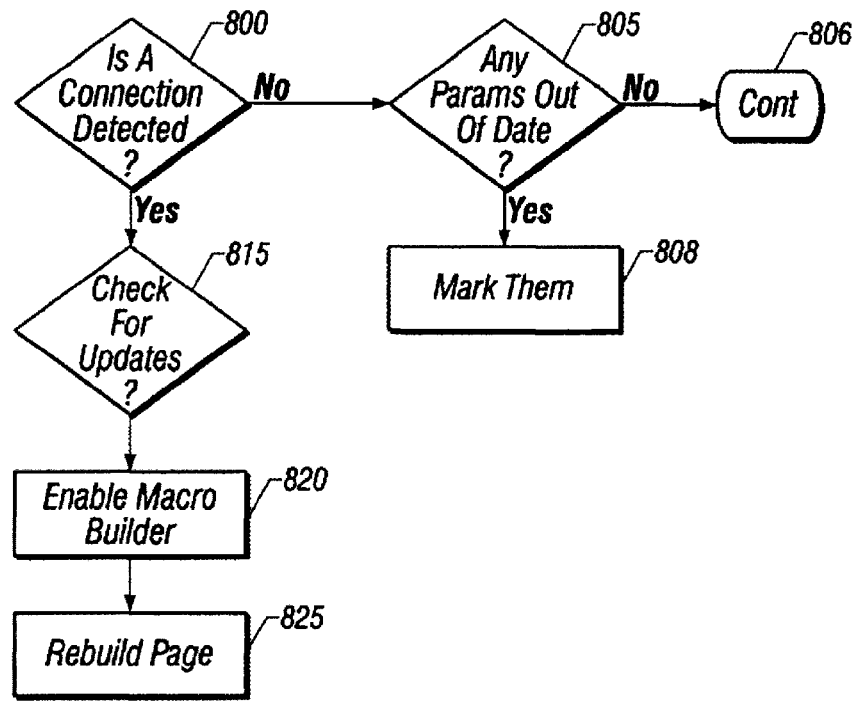
FIG. 8 shows a flowchart of operation of the macro builder.

In operation, the system follows the flowchart of FIG. 8. At 800, the system detects the connection is available. In some hand-helds, the connection may be continuous. In others, the connection is only available when the user requests such a connection, e.g. by opening it. If a connection is not available, the system detects if any of the parameters are out of date at 805. If not, other flowchart operations continue at 806. However, if any parameters are out of date at 805, they are marked at 808. For example, the marking may include shading them, causing them to flash, or simply displaying them in a different color.

If the connection is detected, then 815 checks for parameter updates to each of the parameters which is marked with timed updates. A connection must also be available for this embodiment of the macro builder to operate as described, and hence the macro builder is enabled at 820. In addition, after the updates are detected, the page shown in FIG. 6 is read at 825.

The above has described a special way of forming a macro/script to obtain information from the Internet. It should be understood, however, that any similar macro readers can be used to form a script that automatically detects certain information from web sites without requiring modification of those web sites. According to another embodiment, the macro can be formed on different computers such as a user's desktop PC. Many times the screens that are available in the handhelds are simply too small to enable the contents of a complete web site to be easily seen. Accordingly, in this embodiment, the user may form a macro that obtains the sequence of information from actions that occur on their desktop computer, as part of the macro builder that is present on the desktop computer. For example, the macro that is executed in this way can then be transferred to the handheld computer during a hot sync or during some other type of synchronization.

This can be done via a program that runs on the PC which continually monitors keystrokes. For example, this program may run as a plug-in to an Internet Web browser. A plug-in monitors keystrokes and communications to and from all Web sites. It may maintain a buffer that stores those keystrokes, for example the last 100 strokes. When the user has done something on the Internet that they want to transfer to their handheld as a dynamic updatable variable, the user then selects the parameter to be transferred and presses a special hot key. The hot key automatically determines the keystrokes which were carried out to find that desired parameter, and transfers them to a buffer to be later transferred to the handheld. Again this can be done via a synchronization action. A special part of the program may also be used to dynamically determine which parts of the keystrokes require variables to be associated with them and which parts can simply be executed based on the stored information.

The techniques described above can also be used to interface with a Web service. The Web service can provide the information described above.

Figure 9:
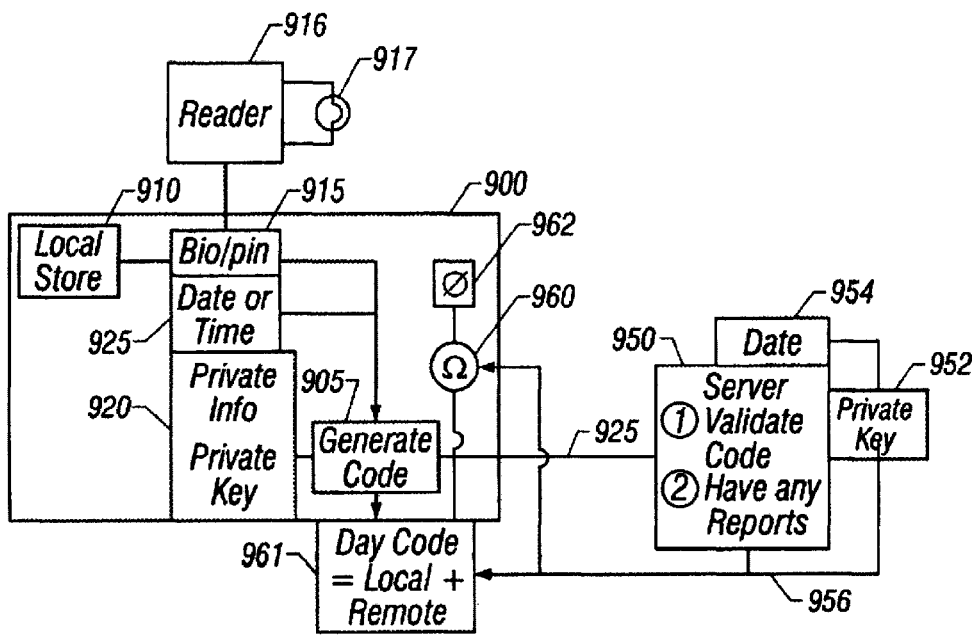
FIG. 9 shows a block diagram of a hand-held which includes encryption capabilities.

FIG. 9 shows a specific application of this system to a handheld used for high security transactions such as a credit card. Once again, this computer may be credit card sized in this embodiment. The computer 900 includes a processor 905 which may be a special-purpose processor or may simply operate according to stored instructions. The computer 900 includes a local storage unit 910 which stores memory information. Part of the memory that is stored may include the user's personal information such as biometric information or a personal identification number. The memory may also store private information such as a user's private key in a public key cryptography system.

In operation, the computer uses the private key to generate a code 925 in the processor 905. That code 925 is generated using the private key using either a public key encryption system or some other similar system. The code is produced using a coding scheme such as public key encryption that allows it to be verified as being authentically produced by the private key, without revealing enough to enable the authenticating unit to itself generate an authentication of the code. The code may be a one time code, for example, based on a concatenation with date and timestamp from the date and time unit 923. In an embodiment, the computer may also include a biometric reader 916. For example, this may be a reader unit. In an enhanced-security embodiment, a user enters their biometric information, e.g. a thumbprint, an indicator light 917 is illuminated to indicate that the thumbprint has been properly taken. The thumbprint is compared with the information indicative of biometrics within the local storage unit and specifically within storage part 915. Since this is simply a go/no go comparison with stored biometric information, a much lower chance of false negative is found. For example, comparing the thumbprint to a database of hundreds of thousands of thumbprints may be difficult. However, in this case, a very low threshold of similarity can be used to enable the thumbprint to be indicated as accepted with a low threshold of matching. This may minimize the number of false negatives.

All of the information is sent at 925 to a server 950 that validates the code that was sent out, and determines if there are any reports of a lost or compromised card. If not, the server itself generates a verifiable encrypted code using its private key 952, and a session code such as the date 954. The server-generated code is returned as 956. This returned code is effectively a security certificate.

Within the computer 900, a verification code is established and stored in 961 that may include the local code that has been generated using a session key, in addition to the remote code from the server. The local code may also include an indication of the go/no go status from the biometric reader, or alternatively may require the user to enter a personal identification number. When the received code is established by the processor as representing an accepted card, the indicator 960 is illuminated. This indicator indicates that the code has been obtained a certificate that has been obtained and the card is authorized for current use.

The indicator 960 is also driven by a real-time clock 962 that expires the code at specified intervals, e.g. every 24 or 48 hours. Therefore, at these intervals, the user must carry out some operation, specifically the user must do at least one code entry, biometric entry, verification of private key by the server 950, or the like. The code stored at 961 can indicate that verification has been carried out and completed within the set interval. In this way, the user can be authorized for payment without requiring that the user seek verification of their credit or credit card from the remote source. Instead, the validation is a security certificate that is good for a specified time.

This kind of validation can be used for other things besides purchases, including phone calls, stamps and the like and for many small transactions.

In this paradigm, the vendors can simply determine if the card has the illuminator 962 in its verified state. If so, the vendors can (but do not have to) accept this card without checking it.

While the above has described the inidicator being a simple illumination, it can also be an electronically controlled hologram, or other type of display that changes to indicate that the card is redified. The card can also communicate its authorization via electronic means, e.g. it can send a message indicating that it is currently authorized.

Another application of this system is possible. In an online auction, a user is often rated by how many times they have carried out positive transactions. The rating is used by others to determine how reputable the seller/buyer actually is. In this embodiment, the user can call up the auction site 634, and determine things including items on their watch list, and items being bid on. The auction site may also have certain features. For example, these features may include ability to place a bid at a specified time within the auction, ability to retract bids, and other such features. In this embodiment, the user's rating is used to enable the features. For example, a user with rating between 0 and 20 may be allowed only certain score-level features such as 10 items on the watch list, no special notifications, no timed sensitive bids, and others.

Users with ratings over 20 may then be allowed more items on their watch list e.g. 20 items. The users may be allowed special notifications when certain items meeting certain criteria are placed for auction. These users may also be allowed to place bids at certain times within the auction, for example the user may be allowed to place their bid now, with the bid amount to be released only one hour before the end of the auction. These users may also be allowed a certain number of bid retractions.

As the rating increases, the users are allowed additional features. Therefore, when the user calls up the auction site at 634, the user gets more functionality based on their rating.

Another embodiment relates to the way in which users attempt to find specified types of businesses, especially in unfamiliar territory. Certain automobile-installed navigator systems enable a user to search for restaurants by name, for example. Users can also search for other services, such as auto repair and the like. This search facility, however, is necessarily limited, and does not have the flavor of a Yellow Pages type phone book. Of course, however, most users do not carry the voluminous Yellow Pages along with them on trips. Certain online systems are available for Yellow Pages, but they often rely on each subscriber to pay a fee, and therefore they are much less than complete.

The present system describes a new paradigm for enabling Yellow Pages to exist on an electronic media. The system recognizes that at least some of the content of the Yellow Pages could be much more easily stored in removable non-volatile miniature memory. Many different forms of this memory are known including CompactFlash, SD memory, Memory Sticks, and others. This memory can store data. Currently, memory of this type which stores 256 MB is commercially available. 1 GB memory and more will be available in the future. As described herein, by categorizing the information and storing it as plain text, minimal information need be stored for each entry. For example, an entry with approximately 100 words made be estimated to take around 400 bytes. Another 100 bytes may be used for a digest of the information, to simply the searching. With 500 bytes per entry, this enables 256,000/500 or approximately 500,000 different listings per 256 meg card. Higher capacity cards will enable more data to be stored on a single card. For example the Yellow Pages for the entire United States could be stored on a single card of sufficient size.

Figure 10:
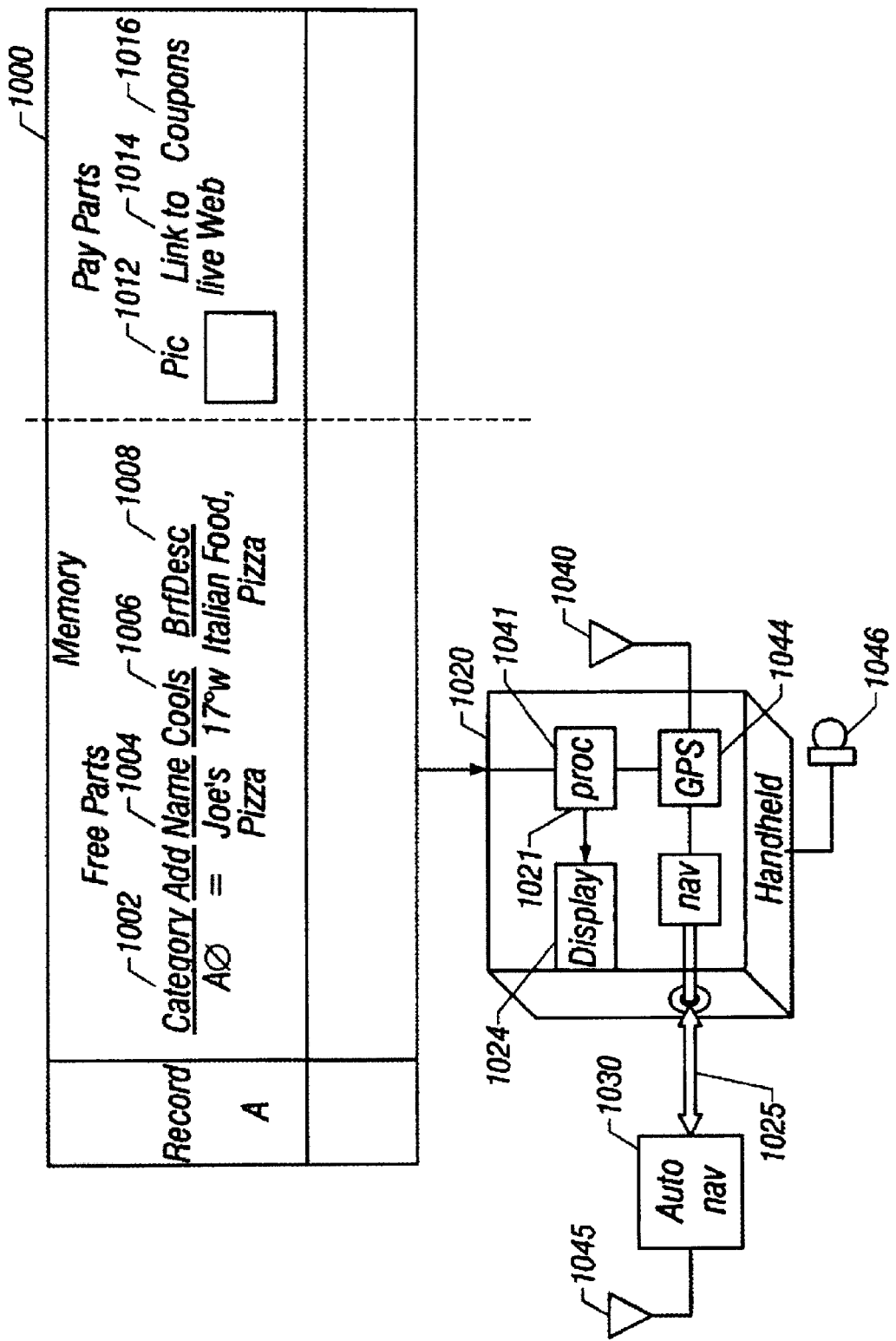
FIG. 10 shows a block diagram of the hand-held and its internal memory configuration.

In this embodiment, the information is stored in a low density form, such as for example as tab delimited ASCII text. The memory 1000, and its contents, are shown in FIG. 10. Each establishment may receive a free listing, in order to encourage the establishments to list themselves and provide a fullness for the database. The free parts may include a category 1002 which may represent the kind of business, for example restaurants, pet store, and the like. Business information 1004 may include name, address and the like. In addition, the GPS coordinates, that is longitude and latitude, 1006 may be provided. The free listing may also allow brief descriptions such as 1008 of the type of establishment, enabling the users to provide some brief description. The pay parts 1010 are additional parts that get included for a fee. As shown herein, this may include a picture showing some aspect of the business at 1012. It may include a link to a live web site that provides real-time information from that web site. For example, the link may include today's specials, or sales. For a restaurant, the link may return today's menu. The link can also include a link to current stock. Promotional coupons 1016 may also be included within the pay parts. All of the information from this system is available to the handheld and available for use by the handheld processor.

In this embodiment, the handheld may include navigation capabilities or a link to a navigator. The navigation capabilities may also interface, when necessary, with automobile navigation. 1030 includes the auto navigation, with the link 1025 being a wireless link such as bluetooth or 802.11 wireless link. Then the unit in the handheld 1020 may carry out the complete navigation operation, or may carry out only some minimal subset of the navigation operation, allowing the actual navigation to be carried out by the auto navigator. The entire navigation may be carried out on a handheld. However, since GPS signals are difficult to receive under a roof or indoors, it may be useful to interface the GPS device with a source of GPS signals, such as from the automobile. In this embodiment, for example, the automobile navigator part 1030 may provide nothing more than GPS signals which are used by the handheld 1020. An advantage of this system is that the coordinates end point can be easily entered into the GPS device, enabling easy navigation to the desired location.

In this embodiment, a GPS receiver in the automobile mounted navigator 1030 may receive some part of the GPS signal using an external antenna 1045. The receiver may simply be a repeater, or may modulate part or all the GPS signal. Either the GPS signal itself, or the content of the GPS signal 1025, is then sent to the receiver 1044 in the handheld 1020. In this way, the GPS signal can interface with another unit that may be an assistance to the handheld computer.

This system may also update the contents of the "Yellow Pages" via a Web service or the like. The updates may be a subscription service, and may be provided either periodically or continually. Each version of the records, or the index, may have a version number to enable the system to determine its updates status. Alternatively, the entire contents may be updated periodically.

In operation, the handheld may use its GPS capability to determine its current location or may obtain the current location via network link (wired or wireless) from another navigation system alternatively or the current address may be manually entered. In default, a 10 mile circle from the current location may be set, although the exact desired default may be selectable by the user. For example, the user may decide to select a 50 mile radius for a specified search. The processor 1021 searches for all coordinates 1006 that are within the specified distance of the current coordinate. This may be done by sorting the information within the memory 1000 by distance and looking for specified category information 1002 within that subset. The returned results can be sorted in any desired fashion. Usually one might prefer sorting by distance from the current location. Also, users who have paid for premium listings may be returned ahead of free listings. The processor 1021 displays the results on display 1024. The user can then scroll using typical user interface techniques, request additional information, change the parameters, and request more information on a specified place. For example, if the category "pizza" were selected, the user could obtain a link to the live Web, to thereby obtain dated information.

The above has described putting this information on a memory card, however it should be understood that this can also be provided as a Web service.

As shown in FIG. 10, the handheld may also include a camera. Handheld devices may conventionally include cameras in order to take pictures. In this embodiment, the camera may also be used to identify the users surroundings. For example, in addition to the GPS device determining the current location of the handheld, the camera 1046 may be used to determine either supplemental position (i.e. which direction or what landmark is the user facing), or information itself by looking for landmarks. In operation, the system may acquire images over camera 1046. In these images may be used in addition to the information from GPS device 1044, or in place of that device, and processor 1041 may analyze the image to determine to "salient" contours in the image. This may be done using the techniques described, for example, in U.S. Pat. No. 5,566,246. Once determining the salient contours, the real life items in the images may be identified. These real-life items may then be correlated against a digest of items which are in the users vicinity. The closest match may then be used to determine information about the users position and facing direction. In another embodiment, specialized landmarks may be placed in various locations. For example, a special kind of landmark which is optimized for analysis via image detection may be placed. This landmark may have a specified type of visual signature, infrared signature or the like. For example, the landmark may be a special kind of bar-code that can be detected and analyze via the camera. By detecting that specified landmark, the handheld obtains an exact information about where the user is located. That's special information can then be relayed back and used to obtain further information.

Although only a few embodiments have been disclosed in detail above, other modifications are possible. For example, while the above has described certain kinds of computing mechanisms, it should be understood the other computing mechanisms may alternatively be used. All such modifications are intended to be encompassed within the following claims, in which:

The invention claimed is:

1. A computing device, comprising:
a handheld housing and processor and display, said display displaying a plurality of different indicators, and wherein at least one of said indicators, when selected with a single actuation, selecting execution of a pre-stored sequence of actions based on said single actuation that interface with a remote internet site, takes some action on the remote internet site, and returns information from the internet site, all based on said single actuation, wherein said sequence accesses a plurality of different Internet sites, and said information is based on said plurality of Internet sites.

2. A computing device, comprising:
a handheld housing and processor and display, said display displaying a plurality of different indicators, and wherein at least one of said indicators, when selected with a single actuation, selecting execution of a pre-stored sequence of actions based on said single actuation that interface with a remote internet site, takes some action on the remote internet site, and returns information from the internet site, all based on said single actuation, wherein at least one of said indicators includes an area for entry of variable information, and wherein said variable information is sent to said Internet site.

3. A device as in claim 2, wherein said remote Internet site includes a bank, and said information includes a balance from said bank.

4. A computing device, comprising:
a handheld housing and processor and display, said display displaying a plurality of different indicators, and wherein at least one of said indicators, when selected with a single actuation, selecting execution of a pre-stored sequence of actions based on said single actuation that interface with a remote internet site, takes some action on the remote internet site, and returns information from the internet site, all based on said single actuation, wherein said information includes a plurality of different actions on said Internet site that can be carried out.

5. A computing device, comprising:
a handheld housing and processor and display, said display displaying a plurality of different indicators, and wherein at least one of said indicators, when selected with a single actuation, selecting execution of a pre-stored sequence of actions based on said single actuation that interface with a remote internet site, takes some action on the remote internet site, and returns information from the internet site, all based on said single actuation, wherein said sequence of actions that are carried out navigate through a sequence of actions on said Internet site and return a specified value.

6. A device as in claim 4, wherein said plurality of different actions include at least one action that can be selected to carry out said sequence of actions on said Internet site.

7. A device as in claim 2, wherein said Internet site enables bids to be placed on items, and said entry of variable information is an area where a bid amount can be input.

8. A device as in claim 1, wherein said sequence of actions comprises taking a first action on a first Internet site, to obtain a first value, and taking a second action on a second Internet site using said first value to access said second Internet site.

9. A device as in claim 8, wherein said first action comprises obtaining a first bill amount from said first Internet site which represents an Internet site holding bills, and said second action comprises paying the bill amount obtained from the first Internet site using said second Internet site, which is a bank's web site.

10. A computing device, comprising:
a handheld housing and processor and display, said display displaying a plurality of different indicators, and wherein at least one of said indicators, when selected with a single actuation, selecting execution of a prestored sequence of actions based on said single actuation that interface with a remote internet site, takes some action on the remote internet site, and returns information from the internet site, all based on said single actuation, wherein said action with the remote Internet site comprises validating a secured transaction.

11. A device as in claim 10, further comprising an indicator with a first state indicating that said validating has occurred within a first specified time and a second state indicating that said validating has not occurred within a specified time.

12. A device as in claim 10, further comprising a biometric reader, associated with said validating.

13. A device as in claim 10, further comprising a memory storing a secret encryption key, and wherein said validating comprises using said secret encryption key.

14. A device as in claim 11, further comprising a memory storing a secret encryption key, and wherein said validating comprises using said secret encryption key, and wherein said action comprises sending a message to the remote Internet site, validating said secret encryption key at said remote Internet site, and returning an indication of a valid secret encryption key to take said first state.

15. A device as in claim 1, further comprising a handheld housing and wherein said processor and display are housed by said handheld housing.

16. A device as in claim 1, wherein said processor and display are battery driven.

17. A computer, comprising:
a network connection;
a user interface, which displays at least one indication, where a single actuation causes a prestored sequence of actions to be carried out over said network connection; and
a processor, which operates based on a selection by said single actuation, of said prestored sequence of actions, to execute said prestored sequence of actions over said network connection based on said single actuation and no other necessary actuations, wherein said processor detects whether said network connection is available at a current time, and executes said prestored sequence of actions at a later time if said network is not available at said current time.

18. A computer as in claim 17, wherein said processor executes each of a plurality of different prestored sequences of actions whenever said network connection is available, to obtain updated information each time said network connection is available.

19. A computer, comprising:
a network connection;
a user interface, which displays at least one indication, where a single actuation causes a prestored sequence of actions to be carried out over said network connection; and
a processor, which operates based on a selection by said single actuation, of said prestored sequence of actions, to execute said prestored sequence of actions over said network connection based on said single actuation and no other necessary actuations, wherein said prestored sequence of actions accesses an Internet site to obtain specified information from said Internet site.

20. A computer, comprising:
a network connection;
a user interface, which displays at least one indication, where a single actuation causes a prestored sequence of actions to be carried out over said network connection; and
a processor, which operates based on a selection by said single actuation, of said prestored sequence of actions, to execute said prestored sequence of actions over said network connection based on said single actuation and no other necessary actuations, wherein a single one of said prestored sequence of actions accesses a plurality of different Internet sites, to obtain specified information from each of said plurality of different Internet sites.

21. A computer as in claim 20, wherein said prestored sequence of actions accesses a first Internet site to obtain first information, and accesses a second Internet site using said first information to access said second Internet site.

22. A computer, comprising:
a network connection;
a user interface, which displays at least one indication, where a single actuation causes a prestored sequence of actions to be carried out over said network connection; and
a processor, which operates based on a selection by said single actuation, of said prestored sequence of actions, to execute said prestored sequence of actions over said network connection based on said single actuation and no other necessary actuations, wherein said processor also carries out an operation to validate based on an encryption key.

23. A computer as in claim 22, wherein said processor sends said encryption key to a remote site, and obtains a validation key from said remote site.

24. A computer as in claim 23, further comprising a biometric reader, and wherein said obtains the validation key comprises validating based on both said encryption key and a signal from said biometric reader.

25. A computer as in claim 23, further comprising an indicator, and wherein said indicator is changed in state based on said validation key.

26. A device as in claim 17, further comprising a handheld housing and wherein said processor and user interface are housed by said handheld housing.

27. A device as in claim 17, wherein said processor and user interface are battery driven.

* * * * *